Aug. 18, 1942.   P. SPENCE   2,293,315
HEATING SYSTEM
Filed June 28, 1940   3 Sheets-Sheet 2
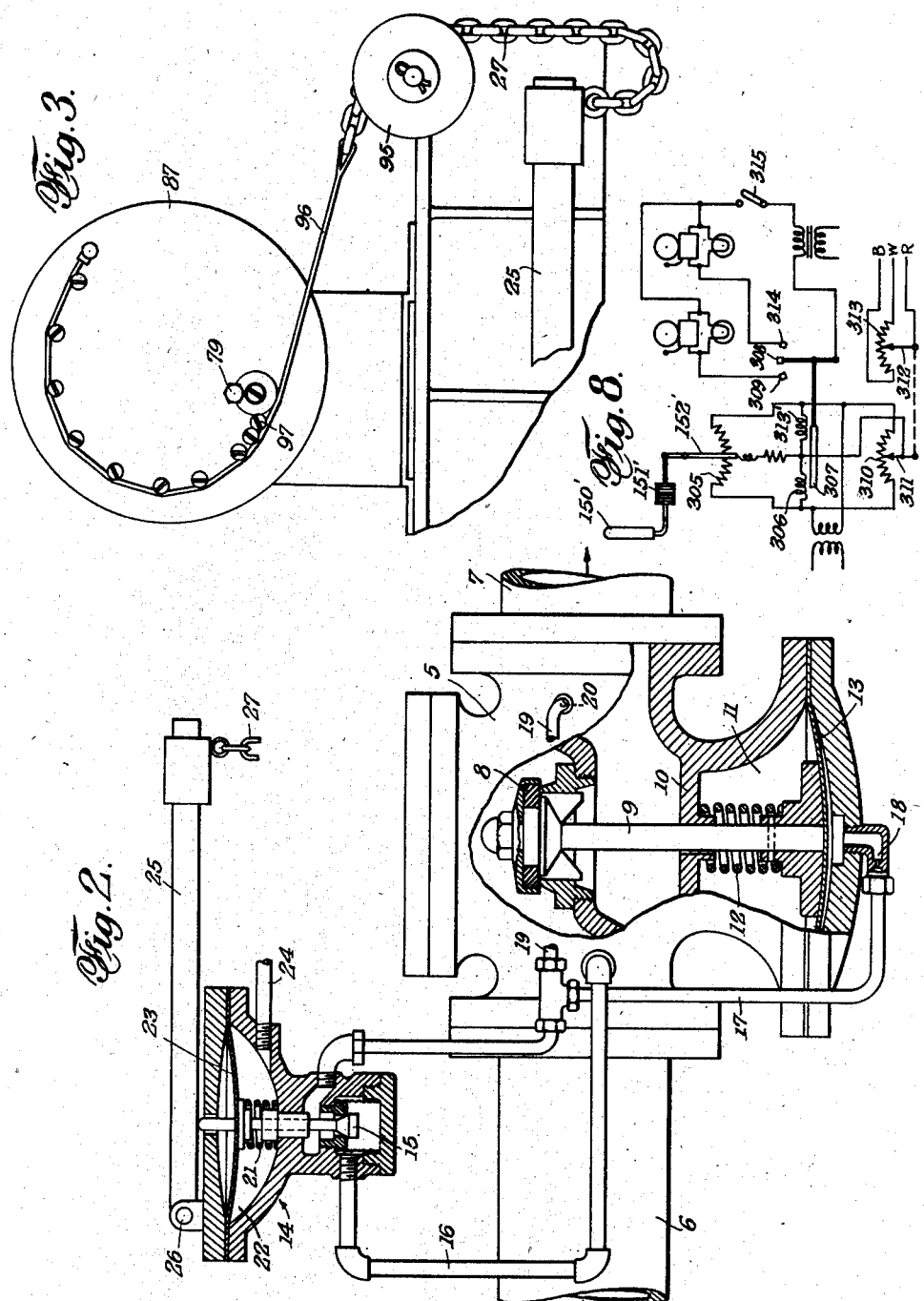
INVENTOR
PAULSEN SPENCE
BY
ATTORNEYS Aug. 18, 1942.
P. SPENCE
2,293,315
HEATING SYSTEM
Filed June 28, 1940
3 Sheets-Sheet 3
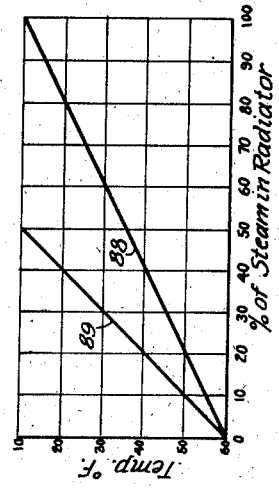
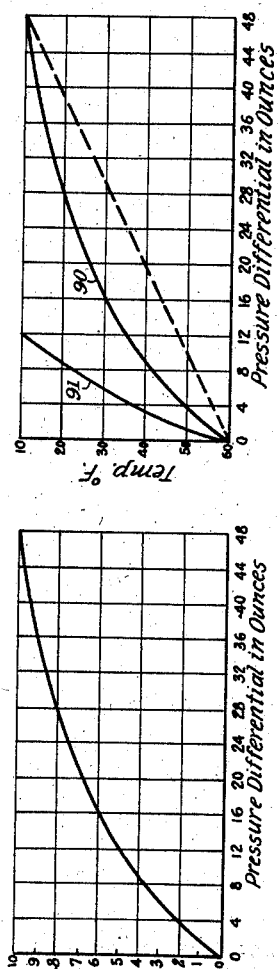
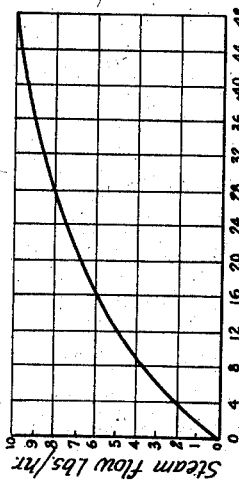
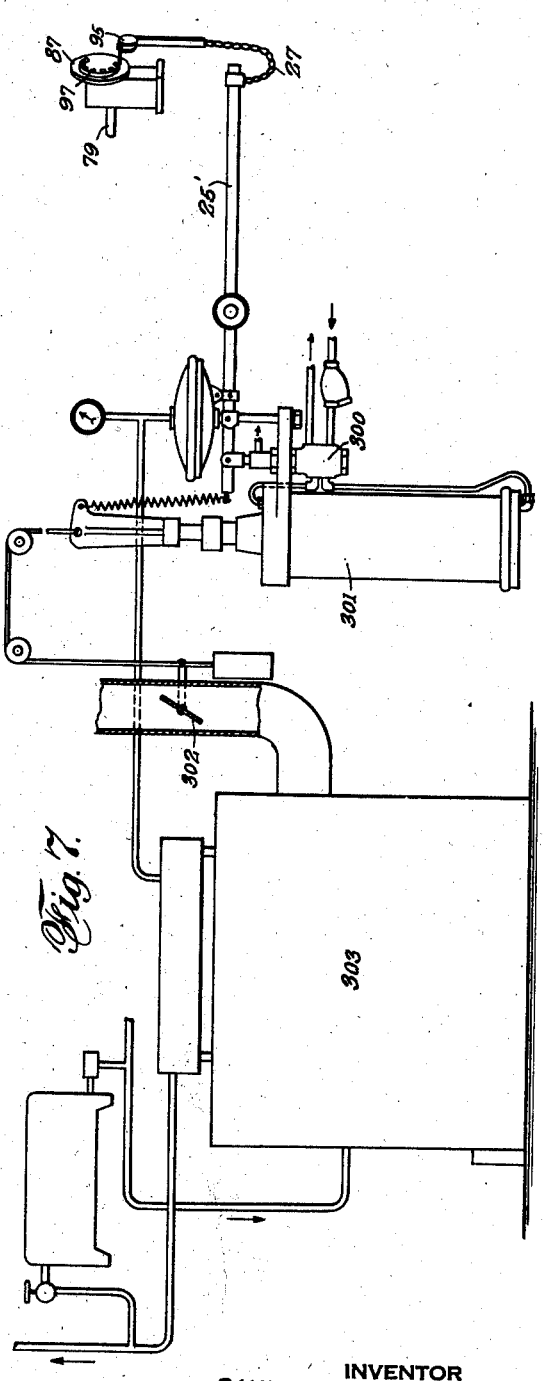
INVENTOR
PAULSEN SPENCE
BY
Mitchell Bechert
ATTORNEYS Patented Aug. 18, 1942

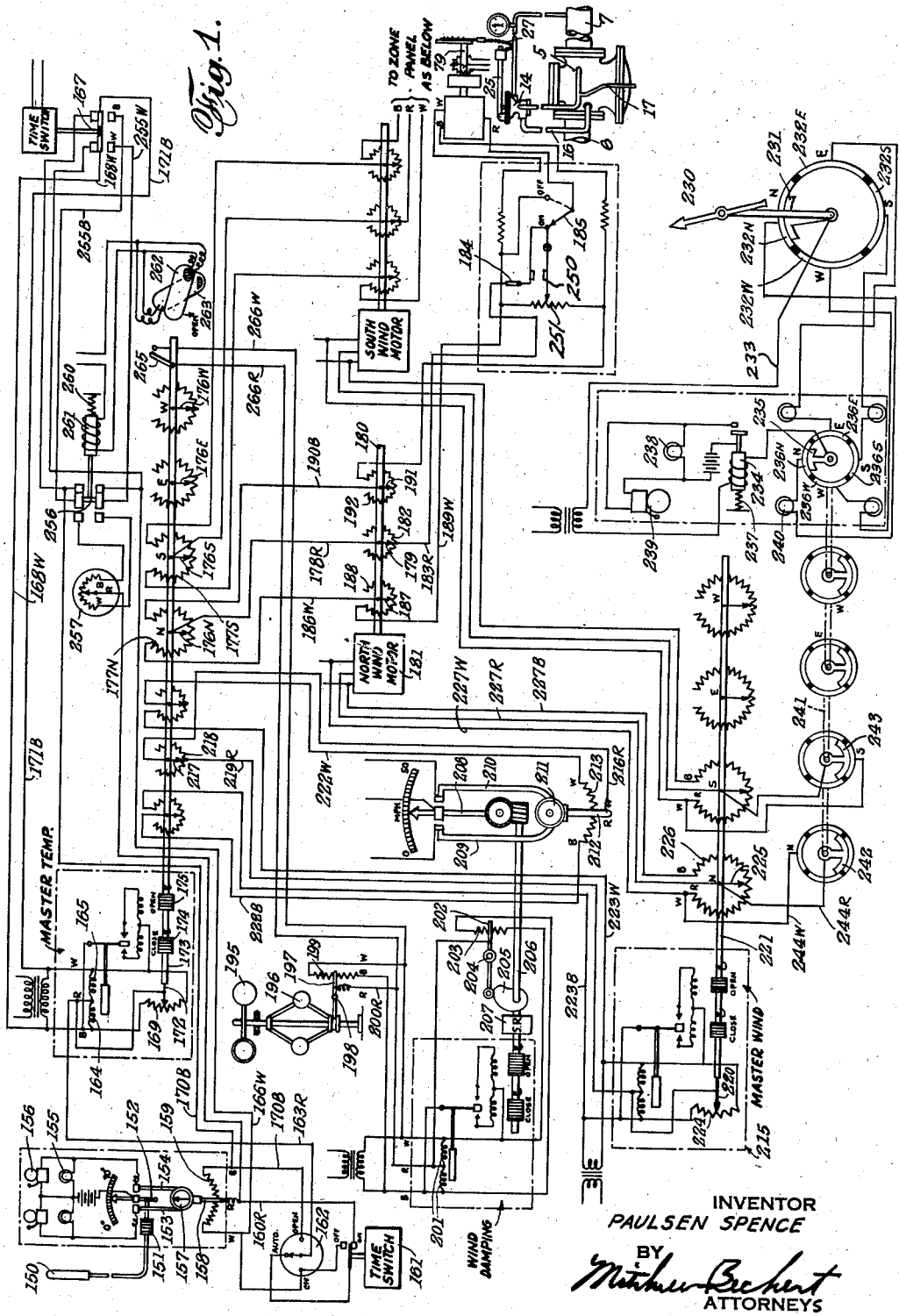

2,293,315

UNITED STATES PATENT OFFICE 2,293,315

HEATING SYSTEM

Paulsen Spence, East Orange, N. J., assignor to Spence Engineering Company, Inc., Walden, N. Y., a corporation of New York Application June 28, 1940, Serial No. 342,875

8 Claims. (Cl. 177—311)

My invention relates broadly to a heating or cooling system and more particularly to control means for such a system. This application is a continuation in part of my application Serial No. 47,778, filed November 1, 1935, and Serial No. 79,327, filed May 12, 1936, the latter now Patent No. 2,211,300, issued August 13, 1940. The invention will be described specifically as embodied in a steam heating system for buildings, preferably large buildings, in which the heating system may be divided up into subdivisions or zones which at times may be individually controlled or varied.

Steam heating systems, when properly designed usually provide for uniform distribution of the steam or other heat carrying medium to the various heat supplying devices, such as steam radiators. Proper distribution of steam to the radiators is conveniently accomplished by placing orifice plates in the inlet sides of the radiators and so proportioning the orifices that the required amount of steam will enter such radiator at specified steam pressures in the mains or lines supplying such radiators.

Specific forms of my control system are herein disclosed as embodied in a heating system wherein during the normal heating range some steam is maintained in all of the radiators and the quantity of steam in each radiator is varied in accordance with the heat requirements of the building or parts of the building being supplied. The principles of the invention, however, are not limited to such a system where steam is always supplied but in varying quantities and may be employed in connection with systems of other types.

My control or controls may be automatic, semi-automatic, or manual, the latter preferably being operated in accordance with automatic indications.

If, by way of example, the heating system is to be controlled by or in accordance with outdoor temperatures, I employ a suitable type of outside thermostat and such thermostats as a general thing have a movable member which moves substantially equal increments for corresponding equal temperature increments. The thermostatic member may control the heating medium, for instance, by controlling the steam inlet valve to the system. I provide means, however, for so controlling the heating medium as by controlling the inlet valve in such a way that equal increments of temperature change do not produce equal pressure increments in the steam supply main; that is to say, in a steam heating orifice system, for example, equal temperature increments in the lower ranges of outside temperatures will require greater steam pressure increments than will equal increments of outside temperature in the higher outside temperature ranges. A heating system which is controlled by or in accordance with outside temperatures will, under definite atmospheric conditions, provide a suitable and adequate control for the building, but atmospheric changes other than temperature vary greatly and there are various factors, among which outside temperature is but one, which control the heat requirements for the building. While the outside temperature is of course an important factor, as stated, it is but one factor and the velocity of the wind striking the building is also a very important factor and even the wind velocity has different effects on different buildings. For example, on a theoretical building which is perfectly tight, the wind will simply serve to carry away the heat radiated from the building and the building will require additional quantities of steam to compensate for such loss, which additional quantities are functions of the wind velocity. In buildings as actually constructed, there is always opportunity for air leakage, or so-called infiltration of air, and such infiltration is higher on the windward side of a building and of course varies with different types of buildings and the construction of the building. I have made provision for controlling the heating system in part by or in accordance with changes in wind velocity and for wind direction.

My improved wind control or wind indicator for manual control preferably exerts its influence on the system independently of or in addition to any other controlling factor so that the entire effect of the wind for any particular building, that is to say, the rapid conduction away from the building of the radiated heat, as well as the infiltration of cold air to the building, may all be properly compensated for.

There are also other factors affecting the heating requirements and which it is sometimes economical to compensate for. In certain ranges of outside temperatures, the relative humidity of the outside atmosphere is a factor. I may provide means for controlling the heating system in part or by or in accordance with the relative humidity of the outside atmosphere. Furthermore, in a building which is exposed on certain sides to the sun, I may provide means for varying the heat supply to such sun exposed sides in accordance with the intensity of the sun's rays. While the controls which I have enumerated, namely, controls in accordance with outside temperature, wind velocity, wind direction, relative humidity of the outside atmosphere, and sun or cloud conditions affecting certain parts of the building, may all be employed in a single system, it is to be understood that these various controls, or partial controls, need not all be used. In fact, at the present time I consider controls, whether automatic, semi-automatic, or manual, in accordance with outside temperature and wind velocities and possibly in accordance with wind direction as being sufficient in most cases at least. Furthermore, control by or in accordance with outside temperature alone will often suffice.

As has been stated heretofore, the heating system may be controlled automatically or semi-automatically, or manually, the latter preferably controlled in accordance with automatic indications correlated to the manual control. For example, if the heating system is to be controlled manually but in accordance with outside temperature conditions, I may employ means for indicating at a convenient inside control point outside temperature conditions and changes and provide manual means for the heating system control, which manual means will be so correlated to the outside temperature indicating means that when the manual control means is set properly in accordance with outside temperature conditions, that fact will be indicated, and when outside temperature conditions have varied so as to require a different manual setting, there will be an indication of that fact, such as by light or other signal. A manual control similar to one to be actuated in accordance with outside temperature conditions may also be employed for controlling the heating system in accordance with either automatic or semi-automatic indications of wind velocity, wind direction, humidity. In connection with my system, there may be various indicating devices and safety devices and other features, some of which will be hereinafter described.

Generally speaking, it is the object of my invention to provide improved means for controlling a heating or cooling system in accordance with one or more factors affecting the heat requirements of a building.

Another object is to provide manual means for controlling a system and automatic weather condition indicating means correlated therewith so as to provide for a predetermined proper manual regulation in accordance with the indication or indications of said correlated indicating means.

Another object is to provide improved valve control means to provide for the admission of steam or other heating medium in accordance with the heat requirements of the building.

It is another object to provide a steam heating system, which is controlled in a certain heating range and in which periodically during a certain portion of the range the steam pressure is raised independently of any automatic or other control for a short period in order to "blow out" the system.

Other objects are, to provide various features of novelty and improvement relating to a control system, and various safeguards and safety devices, as well as indicating means.

In the drawings which show, for illustrative purposes only, preferred forms of the invention—

Fig. 1 is an illustrative, more or less diagrammatic view of a manual control means, together with correlated means for indicating predetermined proper setting of the manual control in accordance with indicated conditions;

Fig. 2 is a view in partial section of a valve and control means therefor illustrating features of the invention;

Fig. 3 is a view on an enlarged scale of a valve loading means applicable to valves such as shown in Figs. 1 and 2;

Figs. 4, 5 and 6 are curves to illustrate various features of the invention to be described;

Fig. 7 is a more or less diagrammatic view illustrating my control means applied to a damper regulator;

Fig. 8 is a fragmentary view illustrating a modification of parts shown in Fig. 1.

One form of the invention is illustrated in Fig. 1 as embodied in a heating system divided into a number of zones or subdivisions but a steam line, valve, etc., for only a single zone has been shown. It is to be understood, however, that in a system which is not subdivided, that is, one in which there is but a single zone, the valve shown may be considered the main control valve. In the steam heating system shown, the control is designed to maintain a definite steam pressure under given control conditions and to vary the pressure in accordance with variations in the control factors. The actual control, as stated, may be automatic, semi-automatic, or manual, the latter preferably being correlated to automatic indicating or signaling means to assist in setting the controls.

While various types of valve may be employed, I have illustrated a preferred form in Figs. 1 and 2. The valve (Figs. 1 and 2) may comprise a valve casing 5 to which is connected the inlet pipe 6 conducting steam from any suitable source at a pressure which may be constant or varied. The outlet pipe 7 from the valve 5 conducts steam through pipes to the various radiators and the pressure in the pipe 7 is controlled as will be hereinafter described. The valve casing 5 houses the valve 8 which controls the passage of steam from the high pressure side 6 to the low pressure side 7 thereof. A valve stem 9 is secured to the valve 8 and passes preferably downwardly through a partition 10 in the valve casing and into a diaphragm chamber 11. The valve stem 9 preferably fits quite loosely in its passage through the partition 9 so as to permit a restricted flow or bleeding of fluid past the valve stem into and from the diaphragm chamber 11. If desired, there may be any other restricted opening so as to permit fluid communication between the outlet side 7 of the valve and the diaphragm chamber 11. The valve 8 is normally used toward closed position by suitable means, such as a spring 12. A diaphragm 13 is secured thereto or is actuated in one direction by the diaphragm. The diaphragm is urged in the valve opening direction by fluid pressure and due to the communication of the diaphragm chamber 11 with the outlet side 7 of the valve, the diaphragm is urged in the valve closing direction by low pressure fluid and by the spring 12.

The fluid pressure control of the diaphragm and main valve 8 is through a pilot valve designated generally 14. The pilot valve comprises a valve casing having a pilot valve 15 therein and in the present showing opening downwardly. The high pressure side of the pilot valve is in communication through a pipe 16 with the high pressure side 6 of the main valve. The outlet or low pressure side of the pilot valve communicates through a pipe 17 and bleed connection 18 with the high pressure side of the diaphragm 13 and communicates also through a pipe 19 and bleed connection 20 with the low pressure side of the main valve. Thus, when the pilot valve 15 is moved downwardly, that is, toward open position, high pressure fluid from the high pressure side passes through pipe 16 and then past pilot valve 15 and into pipe 17 and through port 18 to the high pressure side of the diaphragm 13, thus raising the latter. Pressure fluid from the high pressure side of the diaphragm 13 may bleed therefrom through the pipe 19 and bleed port 20 into the low pressure side of the main valve. The pilot valve 15 may be urged toward closed position by means such as a spring 21 positioned within a diaphragm chamber 22 of the valve casing. The stem of the pilot valve 15 may pass into the diaphragm chamber but there is preferably no substantial pressure communication between the diaphragm chamber 22 and either the high or the low pressure sides of the pilot valve. A diaphragm 23 is secured to the pilot valve casing and serves to move the pilot valve 15 or permit the same to be moved. The diaphragm chamber 22 and the diaphragm therein are subject to the pressure in the low pressure side 7 of the main valve through a pipe connection 24 connecting the diaphragm chamber 23 with the low pressure side of the valve. The diaphragm 23 is loaded by suitable means, preferably through a lever 25 pivoted at 26 to the diaphragm casing and provided at its free end with suitable loading means such as weights. In the form shown, I employ variable loading means in the form of a loading chain 27 which is paid out or drawn in by means to be hereinafter described. The size of the pilot valve diaphragm and the loading means therefor are so proportioned that with a predetermined load due to the chain 27 the pilot valve will be opened just sufficient to maintain the predetermined pressure of the main valve 5 to be determined by the loading means 27; that is to say, when the outlet pressure of the main valve 5 has reached the desired limit as determined by the loading means, the pressure through pipe 24 will flex the diaphragm against the loading means and permit the valve 15 to close sufficiently to permit less high pressure fluid from passing the valve and thus permit high pressure fluid to pass out through bleed port 18 and eventually out through bleed port 20. The pressure on the discharge side of the main valve therefore balances the pressure of the loading means 27, and the main valve 8 will be held by the diaphragm as well as the other pressures acting thereon and the spring 12 in the position which will maintain the predetermined pressure in the outlet side of the main valve so long as the loading 27 on the pilot valve is not changed. Increasing the loading of the pilot valve will increase the pressure necessary to close the pilot valve 15, and consequently increasing the loading 27 will increase the pressure on the outlet side of the main valve, and conversely decreasing the loading means of the pilot valve will decrease pressure at the outlet side of the main valve. In accordance with my invention, the loading means such as the chain 27 is varied in accordance with one or more control factors.

It is to be noted that the chain 27 or other loading means is not to be moved uniformly for uniform motions of the motor controlling the chain, that is, equal temperature increments, do not produce equal load increments on the valve, and consequently do not produce equal pressure changes in the heating system. My design provides for properly heating the building upon changing conditions, and it is to be noted that equal load increments for equal temperature changes would not cause the building to be properly heated. This will now be further explained.

The curve shown in Fig. 4 is an approximate steam flow curve through some particular orifice, the abscissae representing ounces of pressure on opposite sides of the orifice and the ordinates representing steam flow through the orifice in pounds per hour. The curve shows, for example, that at eight ounces pressure about four pounds of steam will flow per hour, while at sixteen ounces pressure only about six pounds of steam will pass. The curve shown in Fig. 6 is drawn with abscissae expressed in percentage of steam in the radiator, that is, the percentage that the radiator is filled with steam, and the ordinates are expressed in outside temperatures in degrees Fahrenheit. The particular curve is drawn to apply to a system in which at 60° outside temperature there will be no steam in the radiator, while at 10° outside temperature the radiator will be filled with steam. The curve is a straight line and it has been determined, or may be assumed at least, that for the particular building contemplated under the contemplated conditions, the curve of Fig. 6 will be substantially a straight line. It may also be assumed that the lower curve 88 of Fig. 6 represents a curve under the worst heating conditions, that is, maximum wind velocity and other adverse atmospheric conditions. Under ideal atmospheric conditions, it may be further assumed that the upper curve 89 of Fig. 6 represents the percentage of steam which will satisfactorily heat the building at the temperature noted; that is to say, under ideal weather conditions at 10°, with the radiators filled substantially 50% with steam the building will be satisfactorily heated. The range between the two curves 88, 89 of Fig. 6, in accordance with my control system, may be taken care of so that when there is some wind or other adverse weather condition and the temperature is down to 10° more than 50% of steam will be in the radiator and the quantity will be increased to the maximum upon the reaching of the most adverse weather condition for which the control weather system is designed.

The curves of Fig. 5 are drawn with abscissa of pressure differential at opposite sides of an orifice (radiator orifice), expressed in ounces, and ordinates expressed in outside temperatures in degrees Fahrenheit. The curve 90 of Fig. 5 represents the desired steam flow curve at the various temperatures assumed. The curve is of substantially the same shape as the curve of Fig. 4, but is arrived at from combining the data of Figs. 4 and 6. Thus, from the curve 88 of Fig. 6 it will be seen that at 50° it is desired to have the radiator 20% full of steam. From the curve of Fig. 4 it will be seen that 20% of the maximum flow of ten pounds of steam will be about two pounds and that to secure a flow of two pounds of steam per hour a pressure of about three ounces is required. Other points may be plotted and the curve 90 will result. The dot and dash curve of Fig. 5 is merely a straight line to show that if for equal temperature changes there were equal pressure changes, the heating system would be economically effective only at the points of maximum and minimum temperatures for which the system is designed, and at intermediate temperatures much more steam would be supplied than would be required. The curve 91 of Fig. 5 is plotted with the data of Fig. 4 and the curves 89 of Fig. 6 and represents the pressure differential to be maintained under the most favorable atmospheric conditions for different outside temperatures. In other words, it will be seen from the curve 91 that with about a twelve ounce pressure differential, the radiators will be half filled with steam; that is, from Fig. 4 it can be determined that a twelve ounce differential in pressure will pass about five pounds of steam per hour. As indicated heretofore, the range between the curves 90 and 91 will be compensated for by controls other than outside temperature.

Now, if the zone motor rotates equal increments for equal temperature changes and the loading chain 27 were paid out and drawn in in equal increments corresponding to the equal increments of the rotation of the zone motor, the pressure curve in the outlet pipe 7 would follow substantially the dot-dash line of Fig. 5 and, as stated, the building would be properly and economically heated only at the maximum and minimum outside temperatures and at all intermediate points the building would be overheated. I therefore contemplate loading and unloading the pilot valve in such a way that the pressure change in the outlet pipe 7 will be not along the straight dot-dash line, but along the curve 90. A simple and very effective means for accomplishing the above result includes what may be termed the cam plate 87 for winding up the chain. The loading chain 27 attached to the pilot valve lever, or other valve control, may pass over a pulley 95 and be attached to a flexible connector 96, which is trained over the cam surface conveniently formed of pins or the like 97 spaced at their proper places. The center of rotation of the cam disk 87 is the zone motor shaft 79 and the curve taken by the flexible connector 96 is substantially a spiral designed so that for equal increments of motor rotation unequal increments of chain will be paid out or drawn in so that the loading of the pilot valve will cause the pressure curve in outlet pipe 7 to follow substantially along the curve 90 of Fig. 5 (under worst adverse weather conditions). It will be noted that the position of the cam disk 87 in Fig. 3 is such that the zone motor is rotated to its "off" position and the pilot valve is substantially unloaded or balanced so that it will be closed and consequently there will be substantially no flow past the main valve 5 and no pressure outlet pipe 7. When the outside temperature condition changes so as to rotate the cam disk 87 in a counterclockwise direction in Fig. 3, the chain will be paid out and due to the fact that the cam surface of the cam disk is substantially spiral, equal increments of zone motor rotation in a direction to cause the main valve to be opened and the outlet pressure of the main valve increased, progressively increasing loads are put on the pilot valve and the pressure changes in the outlet pipe 7 will increase; that is to say, the pressure curve will follow substantially along the curve 90 (under worst adverse weather conditions) and not along a straight line curve as shown in dotted lines in Fig. 5. Thus, the pressure differential in ounces for the temperature change from 60° to 50° will be only about 3 ounces, while for the temperature change from 20° to 10° the pressure differential will be about the difference between 30 ounces and 48 ounces, or about 18 ounces, and with the pressure changes following substantially along the curve 90, the radiators will be filled substantially in accordance with the assumed desired conditions as expressed by the straight line curve of Fig. 6. The above description of loading of the valve to effect the various pressure changes in the outlet pipe 7 have been described in connection with the valve controlled by the pilot valve, as shown in Fig. 2, but it is to be understood that the pressure changes may be effected by substantially the same means in a direct acting valve as disclosed in parent application Serial No. 47,778.

In some instances, there are certain disadvantages in a fully automatic system, namely, that an automatic control system is often wholly neglected and is expected to always function perfectly. If in such an automatic system due to accident, breakage or other cause the control system either partially or wholly fails to function or functions improperly, it is often a long time before the trouble is detected and great waste often results. I have devised a control system which is controlled by manual means and requires attention, so that the attendant is at quite frequent intervals afforded an opportunity to inspect various features of the control mechanism and if anything appears to be wrong with any part of it the trouble may be corrected without undue delay. While my system of manual control is purely a manually controlled system, such controls are so correlated with automatic indicating mechanism that practically nothing is left to the judgment of the attendant and the automatic indicators indicate the desired changes and also indicate when the desired change has been manually made. Therefore, the economies capable of being effected by a fully automatic control system may, as a practical matter, be effected by my improved manually controlled automatically indicated system to be described.

In the manually controlled automatically indicated control system the particular controls to be described are in accordance with the external temperature, the wind velocity and the wind direction. Other controls might be added and, if desired, all three of the controls mentioned need not be used in any one system; for example, a heating system which is not zoned, that is, where steam for the entire building is controlled from a single valve, there is no necessity for having a wind direction control and in some instances a wind velocity control may be omitted and the heating system controlled only in accordance with the external temperature. Furthermore, there may be instances where the system may be controlled, not in accordance with the outside temperature but may be otherwise controlled, as by hand and further controlled in accordance with indicated wind velocity. In other words, the particular combinations employed will depend upon conditions and various combinations may be made by those skilled in the art.

In Fig. 1, which illustrates one form of my improved manually controlled automatically indicated control system, when the system is to be controlled in accordance with the external temperature, I provide an outdoor temperature indicating device 150, which may be a thermostat or thermometer device and in the form shown is a remote indicating thermometer. From the external thermostat member 150 a connection leads to a Sylphon device 151, which is connected to actuate the indicating needle 152 in accordance with the external temperature. It will be noted that the temperature scale runs from 0 to 70 and the needle is designed to traverse the scale in accordance with the temperatures indicated.

Adjustably mounted on the panel carrying the indicating needle device is a double contact or yoke member having contact arms 153—154, which are positioned so that the indicating needle 152 may contact with either arm in its movements across the temperature scale. It will be seen that in the position shown the indicating needle 152 is about central of the yoke and is not in contact with the contact arms. Should the temperature rise, the needle will be deflected toward the right and will indicate the outside temperature on the scale and when moved a few degrees, depending on the sensitivity as determined by the clearance, the needle will contact the contact arm 154 so as to close the circuit through the battery illustrated and will light a signal light 155 and cause the signal bell 156 to sound. Since the indoor control panel including the signal members and the temperature indicating device should be located in a convenient place for the control attendant, the signal light may be seen and the signal bell heard and upon inspection the attendant will find that the outside temperature has been indicated as "rising." Should the outside temperature drop, the needle 152 will contact with the arm 153 and opposite signal devices will be energized so as to advise the attendant that the outside temperature is dropping. It is only when the yoke is positioned so as to break the contact between the needle 152 and the yoke contact arms that the signal circuit will be broken. In order to break the signal circuit the attendant turns the knob 157 in the appropriate direction, so as to move the contact arm away from the indicating needle 152. The signal circuit will then be broken. I take advantage of this movement of the yoke by the attendant to actuate the steam valve in the proper direction and to the proper extent to either raise or lower the steam pressure in accordance with the requirements as indicated by the temperature indicating device.

For the above purpose the yoke-knob combination is provided with a contact blade 158, movable therewith and over a control potentiometer resistance 159. The blade 158 is connected through lines 160R and through a timing switch 161, if desired, and through a manual control switch 162, if desired, and finally with the line 163R and then to the center point of a pair of oppositely acting solenoids 164—165. One side of the control resistance 159 is connected through line 166W through the blow-through switch connector 167 when the latter is raised as in its normal position with a line 168W and then with the outside of the solenoid coil 164 and to one side of the balancing potentiometer coil 169. The opposite side of the control potentiometer coil 159 is connected through line 170B, through blow-through switch contact 167 and then line 171B with the outside of the solenoid coil 165 and to the other side of the balancing resistance 169. The line connection 160R heretofore described is connected to the blade 172, positioned to move over the balancing resistance 169 connected to the shaft 173 of what may be termed the master temperature motor. The solenoids 164—165 serve to move the core for opening and closing the switches to energize and set in motion either the motor closing windings 174 or the motor opening windings 175, depending upon the position of the solenoid control switch, all for the purpose of energizing the valve motor to load or unload the pilot valve as described.

Therefore, when the outside temperature rises, the needle 152 is moved to the right or up on the scale, and if the rise be sufficient in extent the needle makes contact with the yoke arm 154 and the signals 155—156 are put in circuit. The attendant then turns the knob 157 clockwise so as to break the contact between the needle 152 and the yoke arm 154 and during such rotation of the knob the contact blade 158 moves over the resistance coil 159 and reduces the resistance in the left-hand leg and increases the resistance in the opposite leg. Such action, as heretofore described, causes the solenoid 164 to draw the core toward the left for closing the switch of the closing motor, which is then set in motion and rotates the shaft 173, which in so doing (preferably through reduction gearing) moves the blade 172 over its balancing potentiometer coil 169 until such time that the resistances in the legs of the control and the balancing potentiometers balance each other and the two solenoids 162—163 then exert equal pulls on the switch and the latter is opened, thus stopping the master temperature motor. Should the outside temperature fall the indicating needle will make contact with the yoke arm 153 and the signals will be sounded, as heretofore indicated, and the attendant will then turn the knob 157 so as to increase the resistances in the left leg of the control potentiometer and decrease the resistance in the right leg. Such action has the effect of causing the master temperature motor to rotate in the opening direction until the control and balancing potentiometers balance each other and cause the motor to stop. The setting of the master temperature motor shaft controls the steam valve or one or more of the steam valves in a zone system.

In the form shown the master temperature motor shaft carries a plurality of blades 176N, 176S, 176E and 176W, indicating control potentiometer blades for north, south, east and west zones. Each blade has its companion control potentiometer resistance 177N, 177S, etc. The control for only a single zone need be specifically described since the controls for all zones are alike. The blade 176N is connected through a line 178R with a blade 179, fastened to the shaft 180 of what may be termed the north wind motor 188, to be later described. The blade 179 is movable by the north wind motor 181 over a resistance 182, to which is connected a line 183R, which in turn connects through a normally closed switch 184 and switch 185 with the R line of the north zone motor. One side of the control resistance 177N is connected by the line 186W with a blade 187 on the north wind motor shaft and movable over a resistance 188. The resistance 188 is connected through line 189W with the W line of the north zone motor, as will be understood. The opposite side of the control resistance 177N is connected through a line 190B with a blade 191, also on the north wind motor shaft, movable over a resistance 192. The end of the resistance 192 is connected to the B line of the north zone motor. As has been heretofore described, reducing the resistance in the W line, that is, in the left-hand side of the control resistance 177N, serves to energize the zone motor so as to tend to close the valve and reduce the steam pressure in the north zone, and conversely, decreasing the resistance in the B line of the control resistance tends to open the steam valve and increase the steam pressure. Therefore, when the master temperature motor shaft is rotated in accordance with the manual setting of the knob 157, the zone motor or motors will be actuated to turn on more or less steam, in accordance with the requirements as determined by the outside temperature.

In addition to the control of the zone motors in accordance with outdoor temperature I preferably employ a control to modify the steam pressures in accordance with the velocity of the wind and preferably also in accordance with the direction of the wind in such cases where the system is zoned to make feasible the control of steam pressures in accordance with wind direction.

In the form illustrated I employ a wind velocity indicating means, such as an anemometer 195, which actuates a fly-ball governor device 196, which in turn moves a contact blade 197, pivoted to a support at 198, across the control potentiometer resistances 199. The blade 197 is connected through a line 200R to a point between the solenoids 201 of the wind damping motor and is connected to a blade 202, movable along a balancing potentiometer resistance 203. The opposite sides of the control potentiometer resistance 199 are connected through W and B lines with the outsides of the solenoid resistances 201 as well as with the motor windings and to the outsides of the balancing potentiometer resistance 203, the same as heretofore described in connection with the master temperature control motor. The blade 202 may be pivoted at 204 and the free end thereof may be actuated by means of a cam 205 on the motor shaft 206. Thus, when the wind velocity increases, the fly-ball governor will rock the blade 197 in a clockwise direction, thus increasing the resistance in the W-line and decreasing the resistance in the B line, and the motor will be operated so as to rotate the shaft 206 in the valve opening direction, as indicated by the arrow. The cam 205 will rock the blade 202 so as to balance the resistance and stop the motor. The motor rotates the cam through a suitable speed reduction gear 207, so that a considerable number of rotations are required to impart one revolution to the shaft 206. Therefore, the motor will have to operate a considerable length of time before the cam 205 is rotated sufficiently to stop the motor. For that reason all puffs of wind or irregularities of wind velocity will not require manual settings to be described, and it will be only when the wind velocity is sustained for a considerable time that manual settings need be made. While the heat required in accordance with wind velocities is not in all cases directly proportionate to the wind velocity, the fly-ball governor device for setting the control motor likewise does not move strictly proportionately to increases in wind velocity and the cam 205 is designed to cause an indication of setting for a proper increase in steam pressure for predetermined increases in wind velocity.

The reduced speed motor shaft 206 is connected with an indicating needle 208, as by means of the worm and worm gear illustrated and the needle is designed to be moved from the left-hand extreme, indicating no wind velocity, to the right-hand extreme, indicating a velocity of, say, 50 miles per hour. I provide a yoke member having arms 209—210 for contact with the indicating needle 208, for the purpose of setting the signals (not shown) precisely as above described in connection with the temperature control. When the wind velocity increases so that the needle 208 moves toward the right to contact the arm 210 a signal is given, as heretofore described, and the attendant then turns the knob 211 in a clockwise direction, so as to break the contact between the needle 208 and the arm 210, to deenergize the signal device. Such movement of the knob 211 serves to shift a contact blade 212 along a control resistance 213, to control the rotation of what may be termed a master wind motor, designated generally 215. The master wind motor 215 may be in all respects the same as the master temperature motor or the wind damping motor. The blade 212 is connected through a line 216R to a blade 217 on master temperature motor shaft and resistance 218 and line 219R to the motor 215 in the manner heretofore described, including its connection to the blade 220 of the balancing potentiometer on the shaft 221 of the master wind motor. The opposite ends of the control resistance 213 are connected by means of lines 222W and 222B to blades on the master wind motor shaft and to resistances similar to the resistance 218 and lines 223W, 223B to the master wind motor 215 and including the connection to opposite ends of the balancing potentiometer resistance 224, the same as in connection with the previous motors. The master wind motor shaft 221 carries a contact blade 225, movable over a control resistance 226, there being one such control potentiometer for each zone, such as the north, east, south and west zones. The blade 225 and control resistance 226 for the north wind motor 181 are connected thereto through lines 227R, 227B and 227W, as heretofore described, and rotation of the master wind motor shaft 221 will serve to shift the blade 225, so as to vary the resistance in the W and B lines, to cause the north wind motor to rotate either in a closing or opening direction, as has been explained in connection with other similar motors. Assuming, therefore, that the wind velocity increases it will be noted that the wind damping motor will be rotated so as to shift the wind velocity indicating needle 208 to the right and a signal will be sounded, whereupon the attendant rocks the fork 209—210 in a clockwise direction to break the signal contacts and in so doing shifts the blade 212 of the control potentiometer in a clockwise direction, thus decreasing the resistance in the B line and causing the master wind motor 215 to rotate in a valve opening direction, as indicated by the arrow. Such rotation of the master wind motor rocks the blade 225, so as to reduce the resistance in the 227B line and cause the north wind motor 181 to rotate in a valve opening direction. Such rotation of the north wind motor shaft rocks the blades 179, 187, 191 thereon so as to increase the resistance in the 189W line and decrease the resistance in the B line, so as to cause the zone motor to be operated in the valve opening direction. Thus an increase in wind velocity causes the zone motor or motors to open the valve and increase the steam pressure in accordance with the increased wind velocity. Conversely, a decrease in the wind velocity will serve to signal the operator to shift the wind manually controlled member 211 to reduce the steam pressure. Instead of actuating the shaft 221 by a master wind motor it could, of course, be actuated directly by the knob 211.

In the form illustrated, wherein there are four zones, I preferably employ in connection with the wind velocity control a wind direction control, so arranged that upon an increase in the wind velocity the zone motor on the windward side will be actuated to turn on more steam in accordance with the wind velocity but the zone motors controlling the leeward sides are unaffected by the increased wind velocity. Such wind direction control is preferably also manually controlled but correlated to automatic indicating means. I employ a weather vane device 230, which carries a contact arm 231, which may contact with one or in some cases two segments 232N, 232W, 232S and 232E, representing the four wind directions and the zones on the four sides of the building. We shall assume the wind to be from the north and the contact member 231 to be in contact with the 232N segment. The contact member 231 is connected by line 233 with a source of current and one end of a solenoid 234, the opposite end of which solenoid is connected to a manually operable contact member 235, which contact member is capable of contacting engagement with one or in some cases two of the segments 236N, 236E, 236S and 236W. When the wind is from the north, if the contactor 235 is not in engagement with the sector 236N, it will be seen that there will be no flow of current through the solenoid winding 234 and the core will be moved toward the right by means such as a spring 237, so as to make contact with a signal device, such as the light 238 and bell 239. The attendant is thus advised that the contact member 235 should be shifted. As soon as the contactor 235 is shifted into engagement with the segment 236N, the solenoid 234 will be energized through the connections shown, so as to suck the core in and break the contact with the signal devices. At this time the circuit is closed through the north light 240, indicating to the attendant that the wind is from the north. There are corresponding lines for south, east and west connecting the wind vane segments with the segments of the control member. The manual shifting of the contact blade 235 into engagement with segment 236N serves to put the north wind motor 181 in the circuit and to short circuit the south wind motors and other zone motors on the leeward side. In the specific arrangement shown the knob shaft 241, which is rotated manually with the contact member 235, carries what may be termed a gang commutator, there being one ring for each of the north, south, east and west windmotors. These rings are relatively fixed, and the shaft 241 carries contact blade members 242, 243, etc., one for each of the wind motors. The contact members 242, 243, etc., are of sufficient extent to span three of the segments of each of the commutator rings. In the position noted, that is, when the wind is from the north, the contact member 235 when manually shifted to the north position serves to shift the contact member 242, so that it will engage all of the ring segments except the north segment. The north segment top ring is connected by means of a line 244W with the line 227W and the contact member 242 is connected by means of a line 244R with the line 227R. However, since there is no electrical contact between the north sector of the top commutator ring and the contact member 242 the north wind motor 181 will be unaffected, but since the south wind motor and, in fact, all of the other wind motors are in a similar manner connected with their commutator ring segments and contactors, it will be seen that the R and W lines of each of the leeward wind motors will be connected; in other words, the W and R lines of the leeward wind motors will be short circuited and those motors will rotate in a closing direction, that is, so that the resistances, such as 188, on the leeward wind motors will be reduced and therefore the wind velocity will have no effects on the zone motors on the leeward sides. If the wind shifts into another quarter, say, into the west, the action will be the same as heretofore described and the west or windward motor will be actuated to increase the pressure in the west zone and other wind motors will be rotated in valve closing directions, so that the wind will have no effect on such other leeward zones. The wind coming from the northwest, for example, will cause the contact blade 231 to contact both the segments 232N and 232W and the attendant, in moving the contact member 235, will cause both the north and west wind motors to become effective for increasing the steam pressure without, however, affecting the leeward wind motors which, as heretofore described, will be unaffected by increased wind velocity.

It will thus be seen that I have provided a manual control which may take care of various weather conditions as affected by outside temperature, wind velocity and wind direction. Other control factors could also be taken into consideration and controlled by devices similar to those heretofore described.

It is well known that there is greater infiltration of air to a building on the windward side and one reason for providing a wind direction control in connection with the wind velocity control is to supply added steam on the windward side, to compensate for the increased infiltration of air. However, it will be clear that at low outdoor temperatures more steam should be supplied to the windward zone for a given velocity than should be supplied for the same wind velocity if the outside temperatures were higher. I have therefore provided a compensating or regulating means for increasing the steam supplied in accordance with wind velocity when the temperature is low, over the increased steam supplied for the same wind velocity when outside temperature is higher. Such a control is disclosed herein as comprising contact blades, such as 217, on the master temperature motor shaft, which blades contact the resistances, such as 218, in the lines controlling the master wind motor 215. Thus, when the outside temperature is low the contact blades, such as 217, will have been rotated in the valve opening direction, so as to decrease the resistance in the line 223B of the master wind motor and to increase the resistance in the line 223W. This, as explained, has the effect of causing the master wind motor to rotate further in an opening direction and thus more steam will be supplied for a given wind velocity than when the outside temperature is higher and consequently the contact blades, such as 217, on the master temperature motor shaft are in a position to cause greater resistance in the line 223B and less resistance in the line 223W.

Each zone motor is provided with a zone control panel. Only the panel for the north wind motor has been shown in Fig. 1. In that figure it will be noted that the switch 185 is now in its "on" position, but if the same be moved to its dotted line or off position, the W and R lines of the north zone motor will be short circuited and, as heretofore described, short circuiting of the W and R lines of any of the motors heretofore described serves to rotate the same in the valve closing direction and the motor will be rotated so as to shut off the steam. There is another switch 184 in the R line which, when the device is on automatic operation, is closed and such closing may be effected by moving the manual control blade 250 into engagement with part of the switch 184, to close the same and at the same time to cause the control blade 250 to leave the potentiometer resistance 251 interposed between the W and B lines of the zone motor. It will be seen that when the switch 185 is in its full line position and if the manually operable contact blade 250 is rotated so as to cause the same to contact with the potentiometer resistance 251, the switch 184 will open and the circuit from the temperature and wind controls will be broken and the resistance 251 then becomes the control resistance for the zone motor and manual actuation of the contact blade 250 serves as a manual control for the zone motor. Thus, each zone motor may be automatically or semi-automatically controlled, as heretofore described, or, if desired, may be wholly manually controlled independently of weather conditions when desired.

I provide for a timed blow-through of the heating system; that is, at intervals the steam pressure is increased so as to blow out the radiator system, after which the system is again returned to the controls in accordance with weather conditions. However, when the weather conditions are such that no steam is called for, there is no object in blowing out the system and, furthermore, when the weather conditions are such that steam pressures are already increased substantially and maintained at a substantially high pressure, there is no object in increasing that pressure since the system will then require no blowing through. I have provided means for effecting the above results. The blow-through time switch controls the position of the contact member 167. When the switch member 167 makes contact with the lower contacts at the timed intervals heretofore referred to, it will be seen that the circuit to the master temperature motor will be broken by reason of a breaking of contact with the lines 166W and 170B. Contact will then be made through the lines 255W, 255B with a shiftable contact member 256, which, if the latter be in its left-hand position, will make contacts through the manual resistance or potentiometer device 257 and will cause the master temperature motor to be under the control of the manual potentiometer 257 and out of the control of the temperature devices. On the other hand, if the contact member 256 be in its right-hand position, as shown, the lines 166W and 170B will again be put in the temperature control circuit, and will not be under the control of the manual potentiometer 257. I provide means for causing the contact member 256 to occupy either its right-hand position or its left-hand position, in accordance with conditions. A spring 260 serves to urge the contact member 256 toward its left-hand position and a solenoid 261 when energized serves to draw the contact member 256 to its right-hand position. The energization of the solenoid is accomplished in accordance with the position of the master temperature motor shaft. In the form illustrated, the shaft carries a pair of mercury contact switches 262—263. In the position shown of those switches, it will be seen that the mercury in the switch 262 has closed the two end contacts and the solenoid 261 will be energized and the contact member 256 is in its extreme right-hand position and, regardless of the position of the time switch member 167, the master temperature motor will be on the indicated temperature control and not under the control of the manual potentiometer 257. This is the position of the tubes when the temperature conditions are such that no steam is called for and it is undesirable to supply steam for blowing through. However, when the temperature drops somewhat so as to require steam, the master temperature motor shaft rotates so as to cause rotation of the mercury switches 262—263 in the direction of the arrow and the mercury in switch 262 will break the contacts and thus permit the spring 260 to shift the contact member 256 to its left-hand position, so that the blow-through time switch may act normally to cause the system to be blown periodically. When the temperature drops to such an extent that the master temperature motor shaft has been rotated to increase the steam pressure to a substantially high point, it will be seen that the switch 263 will have been rotated so that the mercury therein will have closed the two contacts in the end thereof and the solenoid 261 will again be energized to draw the contact member 256 to its extreme right-hand position, so as to again put the system under the weather controls regardless of the position of the time switch contact 257. Therefore, when the outside temperature conditions are such that no steam is called for, the mercury switch 262 serves to maintain the system on temperature control and thus steam is not supplied and, furthermore, when the temperature conditions are such that the steam pressure has already been raised and no blow-through is required, the mercury switch 263 again maintains the system on temperature control and out of the control of the manual potentiometer 257.

There are times when the outside temperature conditions are such that there should be no steam in the radiators and yet, if the wind be of very high velocity, the wind motor control mechanism would be actuated so as to turn on a substantial amount of steam, even though none be required or justified by the temperature conditions. I have therefore provided means for preventing steam from being turned on or the pressure increased when the outside temperature conditions do not justify any steam pressure or an increased steam pressure. With that end in view I have provided a switch 265 on the master temperature motor shaft which, when the latter is rotated in a valve closing direction to such an extent that the steam will be practically shut off, the switch 265 will be closed and through lines 266R and 266W, the R and W lines of the wind damping motor will be short circuited and that motor turned to its extreme valve closing position so that, regardless of the wind velocity, no steam will be turned on by reason of the wind.

In addition to the controls heretofore described, the entire system may be turned on or off manually through the switch 162 heretofore noted. The control blade of the switch is now in position for weather control. When the latter is moved to its left position the system will be entirely shut off; that is, by short circuiting the R and W lines of the master temperature motor and when the control blade is moved to its right-hand position, the master temperature motor will be turned on full, that is, by short circuiting the R and B lines of that motor. The time switch 161 may be of standard form and may be set to shut off the steam completely for an indefinite interval or intervals, such as during the night, and if the steam has been shut off completely, it will often be desirable when the time switch 161 again puts the master motor in circuit to employ the switch 162 to rapidly increase the steam pressure and maintain the same until the steam heating system is about normal, after which the system may be put onto the automatically indicating controls.

In the modification shown in Fig. 7 the zone motor (if there be zone motors) or the main motor shaft 79 is rotated in accordance with a control factor so as to pay out or take up on the loading means, such as the chain 27, which in this case effects the leoading on a lever 25'. This lever 25' controls the movement of a pilot valve 300, which in turn controls the operation of the fluid pressure motor 301 for operating, say, a damper 302. Thus, when the conditions are such as to call for more steam from the boiler 303, the zone or main motor will cause the lever 25' to be so loaded as to move the pilot valve 300 and cause the fluid pressure motor 301 to open the damper 302. Conversely, when less heat is called for the damper 302 will be closed. The boiler 303 may be either a steam or hot water boiler. The particular type of motor 301 and pilot valve arrangement for controlling its operation are set forth in greater detail in my application, Serial No. 79,327, heretofore mentioned now Patent No. 2,211,300.

In Fig. 8 I have disclosed a slight modification of the control means. It will be noted that in the form shown in Fig. 1 temperature changes will cause fluid in the thermostat 150 to expand or contract, thus actuating the contact blade 152 so as to close the contacts to the signals, such as lights or bells 155—156. In the form shown in Fig. 8 the closing of the contacts is done electrically, rather than as in Fig. 1. With the form shown in Fig. 8, when the temperature increases the fluid in the thermostat 150' will expand, thus expanding the bellows 151' and moving the potentiometer blade 152' in a clockwise direction. Such movement will cause a reduction in the left-hand leg of the resistance 305 and thus cause the solenoid 306 to draw the armature 307 toward the left to close the contacts 308—309 and thus energize the signal circuit. The potentiometer 305 is in circuit with a resistance 310 and a potentiometer blade 311 is movable along the resistance 310. Therefore, when the attendant notes the signal he rotates the potentiometer blade 311 manually, say in a clockwise direction, to balance the resistances in the legs of the resistance 305 and thus permit the armature 307 to move to the right to break the contacts 308—309. This manual movement of the potentiometer blade 311 at the same time moves the potentiometer blade 312 along a potentiometer resistance 313, which is in the B and W wires extending to the zone or main motor heretofore described. The blade 312 is electrically connected to the R wire, also extending to the motor, as will be understood. Thus, when the attendant actuates the potentiometer blade 311 to break the signal circuit he at the same time moves the blade 312 across the resistances 313 (blades 311 and 312 being connected, say, by a common shaft) and the motor will thus be controlled, as heretofore described, for more or less closing the damper or more or less closing the steam valve. Upon a drop in temperature the potentiometer blade 152' will be moved in a counterclockwise direction and the solenoid 313' will then move the contactor 308 so as to make contact with the terminal 314 and again energize the signal circuit. In order to break the signal circuit the attendant will then move the blades 311—312 in a direction to again balance the resistances and break the signal circuit, and while so doing the zone or main motor will be controlled as heretofore described for opening the damper or steam valve to increase the supply of heating medium. A manual switch 315 is provided in the signal circuit so that the signal circuit can be broken when desired.

My invention has been described as embodied in a heating system but it is to be understood that various features of the control mechanism are capable of other uses. For example, the control of Fig. 1 or 8, could be employed for signalling, as for signalling from the bridge to the engine room of a ship. The potentiometer blade 152 or 152' could be moved a certain distance by hand to indicate a command, a signal would then sound in the engine room and the engineer could then shift the balancing potentiometer to break the signal circuit and at the same time the motor control potentiometer would be shifed to control a motor effecting the desired change as indicated by the command from the bridge.

While the invention has been described in considerable detail and various modifications shown it is to be understood that other modifications and various changes, omissions and additions may be made, all within the scope of the invention as defined in the appended claims.

I claim:

1. In a heating system, valve means for controlling the supply of heating medium thereto, means for controlling said valve means including a manually operable member, an indicating means, means for automatically moving said indicating member in response to change in a control condition, electrical connections controlled by the relative positions of said indicating means and said manually operable member, signal means operated by change in said electrical connections, and a hand operated device for moving said manually operable member to control said valve means and simultaneously change said electrical connections.

2. In a heating system, heat supply means, means for controlling said supply means including a manually operable member, an indicating means, means for automatically moving said indicating means in response to change in a control condition, electrical connections controlled by the relative positions of said indicating means and said manually operable member, signal means operated by change in said electrical connections, and means operable by movement of said manually operable member to control said heat supply means and simultaneously change said electrical connections.

3. In a system of the character indicated, a device to be controlled, a manually operable control member, an indicating means, means for automatically moving said indicating means in response to change in a control condition, electrical connections controlled by the relative positions of said indicating means and said manually operative control member, signal means operated by change in said electrical connections, and means operable by movement of said manually operable control member to control said device to be controlled and simultaneously change said electrical connections.

4. In a system of the character indicated, a device to be controlled, a manually operable control member, a movable indicating means to indicate a control change, electrical connections controlled by the relative positions of said indicating means and said manually operable control member, signal means operated by change in said electrical connections, and means operable by movement of said manually operable control member to control said device to be controlled and simultaneously change said electrical connections.

5. In a system of the character indicated, a steam main, valve means for controlling the pressure of steam in said steam main, a manually operable control member for said valve, indicating means, means for automatically moving said indicating means in response to change in a control condition, electrical connections controlled by the relative positions of said indicating means and said manually operable control member, signal means operated by change in said electrical connections, and means operable by movement of said manually operable control member to control the operation of said valve and to simultaneously change said electrical connections.

6. In a system of the character indicated, a steam main, a main regulating valve for controlling the pressure in said steam main, pilot valve means for controlling said main valve, a manually operable control member, an indicating means, means for automatically moving said indicating means in response to change in a control condition, electrical connections controlled by the relative positions of said indicating means and said manually operable control member, signal means operated by change in said electrical connections, and means operable by movement of said manually operable control member to control the operation of said pilot valve and to simultaneously change said electrical connections.

7. In a system of the character indicated, a valve to be controlled, loading means for said valve, a manually operable control member, a movable indicating means to indicate a control change, electrical connections controlled by the relative positions of said indicating means and said manually operable control member, signal means operated by change in said electrical connections, and means operable by movement of said manually operable control member to vary said loading means for said valve and simultaneously change said electrical connections.

8. In a system of the character indicated, a steam main, a main pressure regulating valve for controlling the pressure in said steam main, a pilot valve for controlling said main valve, chain type loading means for loading said pilot valve, spiral cam means for winding up and paying out on said chain type loading means, a motor for actuating said cam means, a manually operable control member for said motor, a movable indicating means to indicate a control change, electrical connections controlled by the relative positions of said indicating means and said manually operable control member, signal means operated by change in said electrical connections, and means operable by movement of said manually operable control member to control the operation of said motor and simultaneously change said electrical connections.

PAULSEN SPENCE.